United States Patent [19]

Bullock et al.

[11] 4,376,053

[45] Mar. 8, 1983

[54] METHOD AND SYSTEM EMPLOYING A FILTER-DETECTOR FOR DETECTING MASTITIS IN COWS

[75] Inventors: George P. Bullock, Cirencester; Barry R. Marshall, Minster Lovell, both of England

[73] Assignee: Ambic Group Limited, Minster Lovell, England

[21] Appl. No.: 191,449

[22] Filed: Sep. 29, 1980

Related U.S. Application Data

[63] Continuation of Ser. No. 35,522, May 3, 1979, abandoned.

[30] Foreign Application Priority Data

Sep. 9, 1978 [GB] United Kingdom ............... 36287/78
Dec. 5, 1978 [GB] United Kingdom ............... 47195/78

[51] Int. Cl.³ ...................... B01D 29/04; B01D 41/04
[52] U.S. Cl. .................................. 210/767; 73/61 R; 73/863.24; 119/14.16; 119/14.18; 119/DIG. 1; 210/94; 210/238; 210/434; 210/447; 210/450; 210/470
[58] Field of Search ............... 119/14.01, 14.14–14.16, 119/14.18, DIG. 1; 210/85, 94, 133, 232, 236, 238, 391, 433.1, 434, 445–448, 450, 454, 474, 470, 471, 310, 767; 73/61 R, 863.24

[56] References Cited

U.S. PATENT DOCUMENTS

| | | | |
|---|---|---|---|
| 1,249,089 | 12/1917 | Hoeth | 210/445 X |
| 1,495,825 | 5/1924 | Von Gunten | 210/445 X |
| 2,099,038 | 11/1937 | Shikles | 210/445 X |
| 2,488,806 | 11/1949 | Crowder | 210/447 X |
| 2,518,831 | 8/1950 | Stalloch et al. | 119/14.01 X |
| 2,547,797 | 4/1951 | Torrey et al. | 210/445 |
| 2,584,206 | 2/1952 | Hodsdon | 210/445 |
| 2,647,767 | 8/1953 | Anderson | 210/445 X |
| 2,665,009 | 1/1954 | Harstick | 210/445 X |
| 2,690,232 | 9/1954 | Brem | 210/454 X |
| 2,727,634 | 12/1955 | O'Meara | 210/445 |
| 2,776,055 | 1/1957 | Adler | 210/445 X |
| 2,818,178 | 12/1957 | Hodsdon | 210/445 |
| 2,879,207 | 3/1959 | Poitras | 210/94 |
| 3,085,689 | 4/1963 | Hering et al. | 210/445 X |
| 3,240,345 | 3/1966 | Butler et al. | 210/310 X |
| 3,302,614 | 2/1967 | Karnath | 210/454 X |
| 3,372,807 | 3/1968 | Barnard | 210/434 X |
| 3,681,562 | 8/1972 | Winzen | 210/434 X |
| 3,788,484 | 1/1974 | Godin | 210/447 |
| 3,971,721 | 7/1976 | Fogarty, Jr. | 210/447 X |
| 4,028,248 | 6/1977 | Murauskas et al. | 210/445 X |
| 4,052,308 | 10/1977 | Higgs | 210/433.1 |
| 4,169,057 | 9/1979 | Gideon | 210/447 X |

FOREIGN PATENT DOCUMENTS

| | | | |
|---|---|---|---|
| 161881 | 3/1955 | Australia | 119/14.16 |
| 108551 | 1/1968 | Denmark | 119/14.16 |
| 978065 | 12/1964 | United Kingdom. | |
| 1133858 | 11/1968 | United Kingdom. | |
| 1216016 | 12/1970 | United Kingdom. | |
| 1344140 | 1/1974 | United Kingdom. | |
| 1371127 | 10/1974 | United Kingdom. | |

OTHER PUBLICATIONS

Hoyle and Dodd, "Mastitis Detection with In-Line Filters", 1970, *Journal of the National Institute for Research in Dairying*, pp. 133–137.

*Primary Examiner*—Robert H. Spitzer
*Attorney, Agent, or Firm*—Larson and Taylor

[57] ABSTRACT

A method for early detection of mastitis in cows, effected during normal milking of cows in a milking parlor, by monitoring the milk taken from each cow for the presence of milk clots, comprises cutting the vacuum milk line to each milking station and inserting a filter-detector therein between the claw and the recorder jar. Each filter-detector comprises a flat-sided transparent casing with a lateral slot which receives a self-sealing slide carrying the filter element. The slide carrier preferably has an integral bypass aperture so that vacuum conditions at the claw end are retained even after the filter element has become blocked. The slide carrier is preferably constructed so that, when in position in the casing, a seepage passage remains between the slide and the casing inner wall, so that cleansing fluid can pass during normal in-place cleaning of the installation.

18 Claims, 4 Drawing Figures

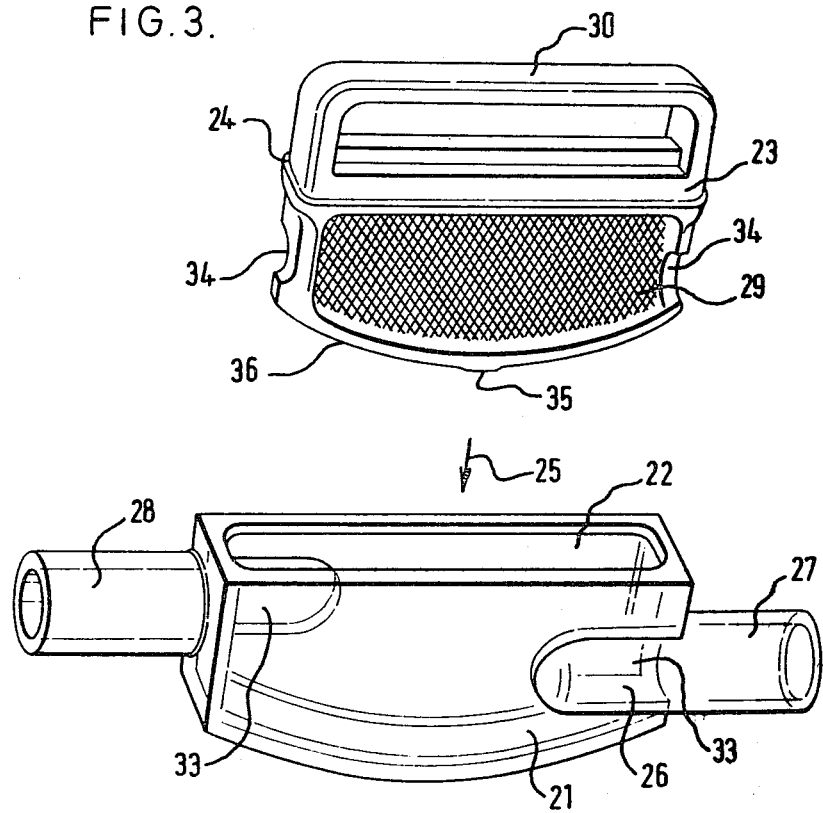

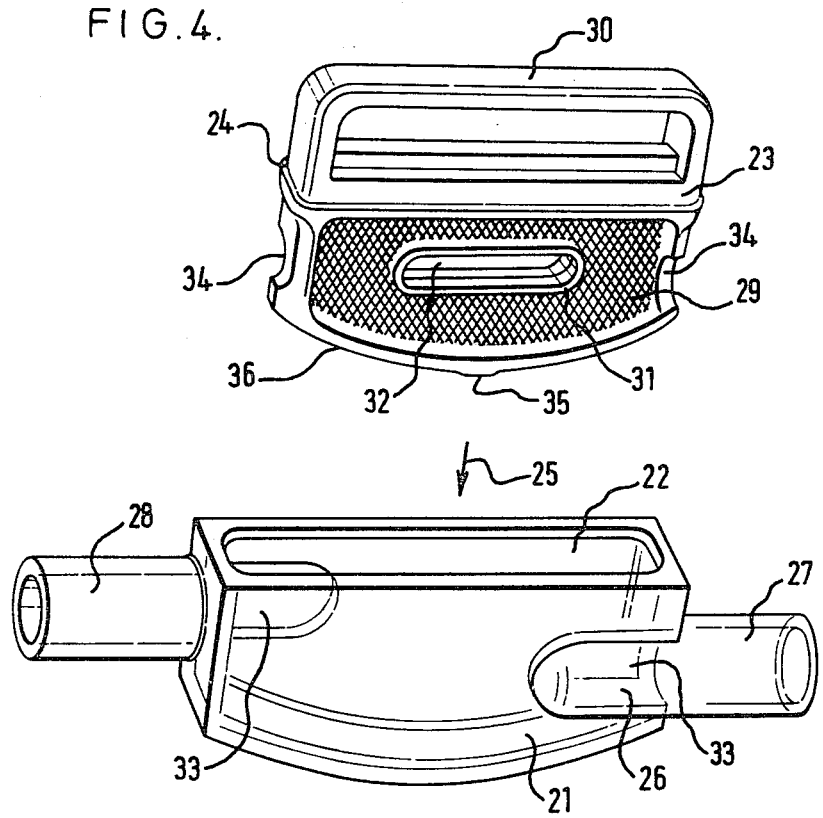

METHOD AND SYSTEM EMPLOYING A FILTER-DETECTOR FOR DETECTING MASTITIS IN COWS

This is a continuation of application Ser. No. 35,522 filed May 3, 1979, now abandoned.

BACKGROUND OF THE INVENTION

This invention is concerned with the specific problem of the early detection of mastitis in cows. The most common early indication of mastitis in a cow is abnormal milk containing clots.

The commonly recommended method for the detection of clots in milk was the foremilk cup, which enabled the first milk from each cow to be examined by the herdsman before normal milking. In practice, many herdsmen do not use the foremilk cup, both because of the time the routine takes and because, in the event of an infected cow, the foremilk cup can act as a reservoir of mastitis pathogens, so spreading the infection from cow to cow.

In 1969, an in-line milk clot detector was developed by the National Institute for Research in Dairying at Reading, England. This detector consisted of a stainless steel mesh filter element moulded into a 15 mm bore transparent polycarbonate tube at an angle of 45° thereto. This filter certainly detected milk clots but, being of small surface area, it quickly blocked if milk clots or debris were present. Blocking adversely affected the vacuum conditions at the teat end of the line so that the milking claw might fall off the cow being milked.

The above noted in-line milk detector was preceeded by a Johnson and Johnson clamshell type filter. However, its construction was such that it did not permit good observation of the milk clots and it was not sufficiently hygienic. The above noted in-line milk clot detector was an attempt to improve upon this earlier device.

Both of the two methods above-described having proved unsatisfactory in practice, there existed therefore a great commercial need for an in-line mastitis detector for use in milking parlours which would not block during the milking and clot-detection operation and which could be easily and thoroughly cleaned both in the normal in-place cleaning of the milking plant by the established methods and in respect of any milk clots trapped.

SUMMARY OF THE INVENTION

The present invention provides filter-detectors which satisfy this commercial need. Four different filter-detectors are described in detail herein. These embodiments of the invention have certain features in common but differ in other features and in the extent to which they satisfy all of the practical requirements. One embodiment is the preferred embodiment in this respect, for reasons which are explained in the full description thereof.

Generally, the invention provides a plurality of filter-detectors, one for each milking station of a milking parlour, so that the milk from each cow is separately monitored.

Each filter-detector is fitted in place merely by cutting the milk flow line between a cow and a container and inserting the filter detector therein.

Each filter-detector comprises:

a casing having opposed transparent faces, permitting visual inspection completely through the casing;

stub inlet and outlet pipes, for connection of the casing into the cut milk flow line ends;

a slot opening in the casing;

a reversible slide carrier, for carrying a filter element and for removably fitting into the slot opening, the carrier being reversible in the slot opening to reverse the filter element faces and the filter element surface area being a number of times greater than the milk flow line bore;

sealing means, for sealing the slide carrier in the casing slot.

A filter detector having all of the above features would best satisfy the practical requirements for a satisfactory filter-detector for mastitis. The large surface area of the filter element delays clogging if milk clots are present and the slide carrier construction permits of easy removal and cleaning of the filter element. With the slide carrier replaced, the whole filter-detector is cleansed in-line during the normal plant cleaning.

Further constructional features are considered advantageous. Thus, the slide carrier may be constructed with an integral bypass, so that even when the filter element itself is clogged, vacuum conditions at the teat end of the milk flow line are maintained.

With advantage, the casing is elongated, the face of the casing slot lies in a plane and the slide carrier has a single ring seal. The milk flow line, being a vacuum flow line, sucks the slide carrier into a tighter sealed seating and does not expel the slide carrier from the casing slot, as would a pressure flow line.

With advantage also, the slide carrier is dimensioned and provided with an abutment with the casing such that a passage is retained between the slide carrier edge and the casing wall, so as to permit the flow of cleansing fluid, during normal plant cleaning, over every surface of the filter-detector which can be contacted by milk. Such abutment may take the form of a stop on the slide carrier edge.

The invention also includes a method of detecting milk clots comprising causing milk to flow through a flow line by applying a vacuum thereto, said flow line having fitted therein a demountable filter-detector of the invention as set out above and inspecting said filter-detector for milk clots which might be retained thereon.

BRIEF DESCRIPTION OF THE DRAWINGS

Embodiments of the invention will now be described in detail, by way of example, with reference to the accompanying drawings, in which:

FIG. 3 is a perspective view of another demountable filter-detector for use as a mastitis detector in milking, the body and filter slide parts thereof being shown separated; and FIG. 4 is a corresponding view of the filter-detector of FIG. 3, but modified to show the preferred form which includes a by-pass.

DETAILED DESCRIPTION OF THE INVENTION

The present invention is concerned primarily with early detection of mastitis in cows, for which purpose a by-pass is preferably provided to maintain a vacuum condition in the flow line even after the filter has become completely clogged. However, the invention is also usable as a milk filter, even if the purpose is not to detect mastitis. The term "filter-detector" as used throughout the specification, includes a device usable either as a filter alone or as a filter which also acts as a detector.

Figure 1:
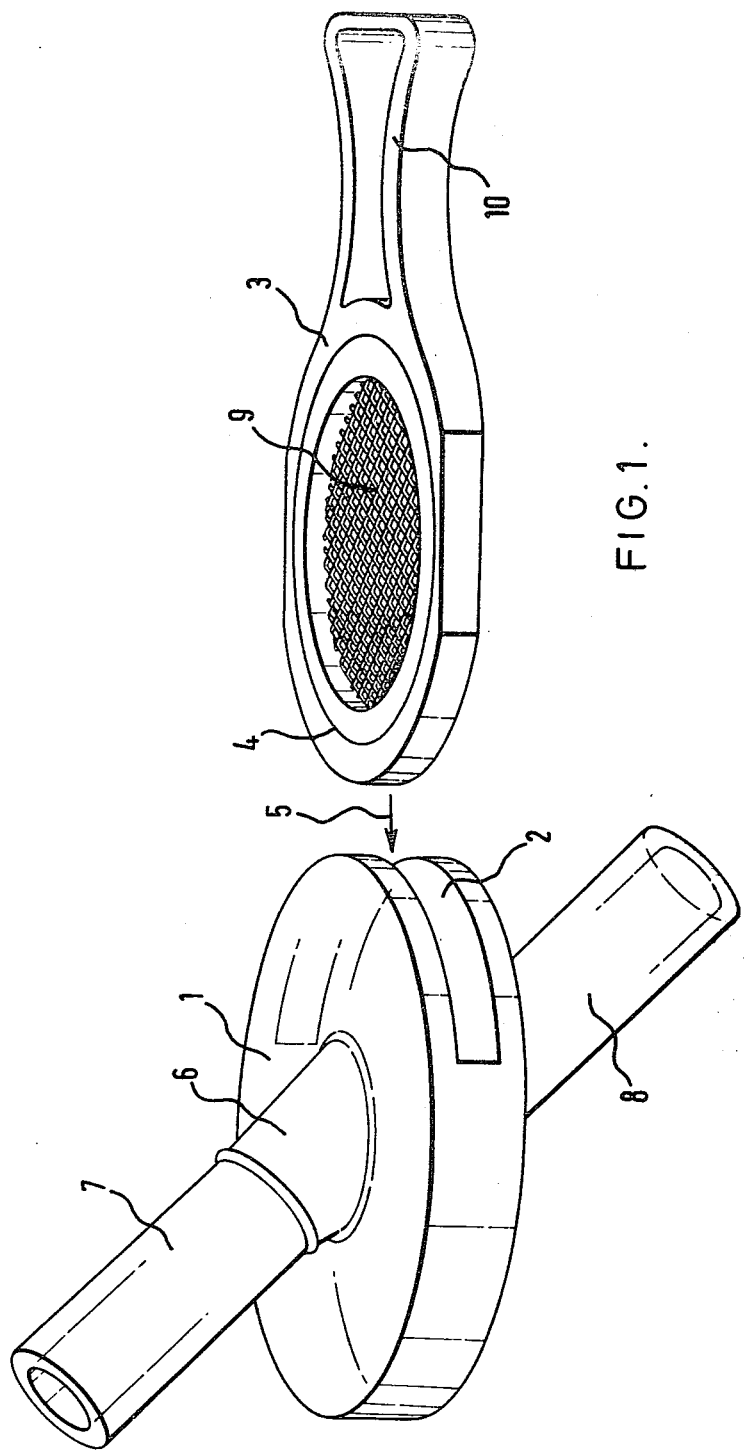
FIG. 1 is a perspective view of a demountable filter-detector for use as a mastitis detector in milking, the two parts thereof being shown separated.
Figure 2:
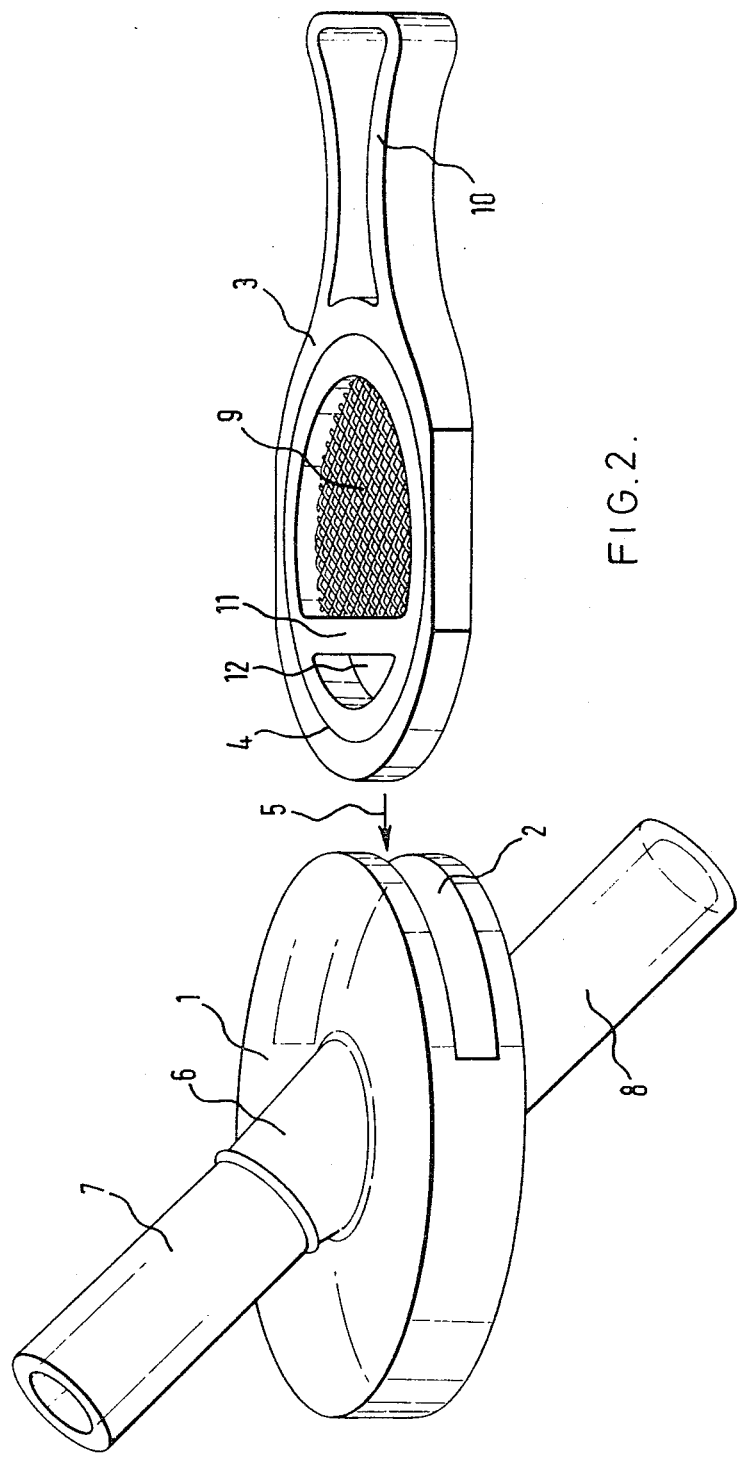
FIG. 2 is a corresponding view of the filter-detector of FIG. 1, but modified to show the preferred form which includes a by-pass.

In FIGS. 1 and 2, wherein like elements are indicated by the same reference numerals in the two figures, the filter-detector comprises a flat, circular, hollow filter-detector body 1 having a slot 2 at one side to receive a filter-detector slide-member 3. The slide member 3 is inserted into the slot 2 of the body 1 in the direction of the arrow 5. The slot 2 has its upper and lower faces tapered inwardly and the slide member 3 is self-sealing when inserted therein by the provision of "O"-rings in the top and bottom faces of the slide member 3, the top "O"-ring being shown at 4. Both "O"-rings are secured in the slide faces by being recessed into and retained by circular grooves.

The filter-detector body 1 is made of transparent plastics material, so that the filter-detector element can be inspected when the slide is in its assembled position.

The filter-detector body 1 has oppositely-angled collars in its top and bottom faces to receive inlet and outlet pipes 7 and 8, respectively.

The slide member 3 is shaped as a circular ring, retaining the filter-detector element 9, and having an offset handle 10, by which the slide member 3 is inserted into and removed from the filter-detector body 1.

In the general form of the filter-detector shown in FIG. 1, the nature of the filter-detector element 9 depends upon the use of the filter-detector and may be wire-mesh coated or uncoated, perforated or expanded sheet or an expendable element retained in a carrier. In the embodiment illustrated, the filter-detector element 9 is wire-mesh. Plastics mesh may also be used.

In the embodiment illustrated in FIG. 2, the preferred form for use as a mastitis detector, the circular aperture of the slide member 3 is divided by a bridge 11 to leave a by-pass aperture 12.

In the embodiment of FIG. 2, the body 1 is made of clear, nylon plastics material and is transparent. The slide 3 is made of resin material such as PPO or ABS.

The body 1 is some 85 mm length between the ends of the inlet and outlet pipes and some 65 mm overall diameter. The milk line inlet and outlet pipes 8 and 7 are 18 mm diameter.

The filter-detector element 9 is P.T.F.E.-coated stainless steel wire-mesh some 11 square centimeters in area with an aperture size of some 150 microns. The area of the by-pass aperture 12 equals the cross-section area of the milking line. The "O"-rings 4 are of nitrile material.

In use, the milk line at each station of a conventional milking installation is cut, after the claw and towards the recorder jar. The filter-detector of FIG. 2 is inserted by drawing the cut ends of the milk line onto the pipes 7 and 8, so that milk flow ingresses through pipe 7 and egresses through pipe 8. With the slide 3 inserted, the filter-detector element 9 is visible through the transparent filter body 1, at the clear part to the right of the collar 6, as viewed in FIG. 2.

Due to the P.T.F.E. coating, the filter-detector element 9 is of black appearance and milk clots can be readily detected. If the filter-detector mesh area becomes completely clogged, and particularly under this condition, the milk flows through the by-pass aperture 12, so that the milk line is not blocked by the clogged filter-detector element. Because of the by-pass aperture 12, neither the cow nor the milking process are affected by clogging of the filter-detector element and, in particular, the teat cups do not fall off the cow due to loss of suction.

A separate filter-detector according to FIG. 2, is used at each milking station of the milking installation. The presence of milk clots in the filter-detector is thus uniquely associated with the particular cow at the corresponding station.

In FIGS. 3 and 4, wherein like elements are indicated by the same reference numerals in the two figures, the filter-detector comprises a flat, hollow filter body 21 having a slot 22 to receive a filter-detector slide-member 23. In the views of FIGS. 3 and 4, the slot 22 is uppermost. The slide member 23 shown above the body 21 in both figures, is inserted downwardly, as shown by the arrow 25.

The slide member 23 has an "O"-ring 24 located in a slot and extending around the slide member 23 so that when the slide 23 is inserted in the slot 22, the "O"-ring 24 seals with the whole of the slot inner face in one cross-sectional plane of the slot.

The filter-detector body 21 is made of transparent plastics material, so that the filter-detector element can be inspected when the slide 23 is assembled therewith.

The filter-detector body 22 has stub pipes 27 and 28 for attachment to the flexible hose of a liquid flow line, so that the filter-detector can be readily inserted in the flow line. The stub pipes 27 and 28 connect into opposite sides of the body 21 so that connection between them is through the filter-detector element. The stub pipes 27 and 28 are not on a common axis, but each is offset towards its respective side providing an overlap portion as at 26 for pipe 27. This feature is discussed more fully later herein.

The description so far relates to both embodiments of FIGS. 3 and 4.

Referring to FIG. 3, it will be seen that the filter-detector embodiment has an internal part comprising a generally rectangular frame into which the filter-detector element 29 is moulded. The nature of the filter-detector element 29 depends upon the use of the filter-detector. It may be wire mesh, P.T.F.E.-coated or uncoated, plastics mesh or expanded metal.

As an alternative to the filter-detector element 29 being moulded into the surrounding frame, the filter-detector element may be retained in a mount which can be fitted into and removed from the frame.

The slide 23 has a lengthwise handle 30, by which the slide is inserted into and removed from the slot 22, which protrudes from the slot 22 above the "O"-ring 24 when the slide 23 and body 22 are assembled.

At the ends of the stub pipes 27 and 28, the frame of slide 23 is cut away at 34 to afford a free passage towards and away from the filter-detector element 29, of about the same cross-sectional area as the stub pipes 27 and 28 themselves. Also the extensions 33 of the stub pipes 27 and 28 ensure that the filter itself restricts to the minimum extent the liquid flow along the flow line in which it is connected.

The slide frame has a stop 35 moulded integrally therewith which abuts the inside of the lower curved surface of the body 21, as seen in the figures. At the sides of the stop 35, the face 36 of the frame is cut away to afford a narrow passage between the slide frame and the body. The effect of this construction is explained with reference to the embodiment of FIG. 4.

As will be readily understood, the filter-detector element 29 of the general filter-detector embodiment of FIG. 3 will collect sediment on its up-stream face and the dirty slide 23 may be readily removed from the body 21, for the cleaning of the filter-detector element 29 or the replacement of the slide, with only short interruption of liquid flow through the line.

Referring now to the mastitis detector of FIG. 4, it will be seen that the slide 23 filter-detector element 29 has a central elongated by-pass aperture provided by an inner frame 31 moulded integrally with the slide 23. The height of the walls of frame 31, determining a circumferential gap with the inner faces of the slot 22, are such that the gap area corresponds approximately to the area of the stub pipes 27 and 28 and the cross-sectional area of the by-pass aperture 32 is also approximately equal. Thus, the stub pipe internal bore, the inlet apertures at 33, 34 and at 26, the gaps on each side of the by-pass frame 31 and the by-pass aperture 32 are all of approximately the same cross-sectional area. In use, the filter-detector of FIG. 4 is inserted in the milk flow line of a milking installation. Any milk clots collect on the upstream face of the filter-detector element 29. However, even should the face of the filter-detector become clogged, the proportioning of the filter-detector apertures and by-pass described above ensure that the milk flow is not restricted. Nor is the milking line vacuum reduced which might otherwise result in teat cups becoming detached from the beast being milked.

A separate filter-detector according to FIG. 4 is used at each station of the milking installation. The presence of clots in the filter-detector is thus uniquely associated with the particular beast at the corresponding station.

The preferred filter-detector medium 29 for the mastitis detector of FIG. 4 is expanded metal. This material has a preferred orientation. As may be seen from visual inspection obliquely through the material, in one orientation the lands of metal obscure the view through the material whereas, in the orientation at 180°, the view is obscured only by the edges of the metal lands. The expanded metal element is moulded in the slide so that the oblique liquid flow through the element is in the unobscured orientation as above described. This orientation ensures that clots are carried into and held by the filter-detector element face and not washed along it and carried through the by-pass aperture. The wall 31 around the by-pass aperture 32 further prevents milk clots being washed through.

It will be seen that, with the moulding of the expanded metal filter-detector medium into the slide 23, the orientation is fixed and is correct regardless of the upstream face presented by the sense in which the slide 23 is inserted in the slot 22 and is also correct regardless of reversal of the filter-detector, pipe 27 for pipe 28, in the milk line.

The foregoing description referred to the stop 35 and the seepage passage 36 between the slide 23 and the slot 22 inner curved face. When the milk line is washed out after milking, the filter-detector is washed at the same time. The seepage passage 36 ensures that no crevices remain between the two filter-detector parts where the cleaning fluid cannot reach.

Further, the wall of the slide frame is tapered away from the slot 22 inner surface immediately adjacent to the groove retaining the "O"-ring 24. This feature avoids the creation of a crevice condition at the inside face of the "O"-ring seal which would prevent effective cleaning during washing out of the milk line.

The seepage passage 36 may be achieved without the stop 35 being present. For example, the slide 23 may be formed with a shoulder (not shown) above the ring 24 which engages the body 21 when the slide 23 is separated from the end of the slot 22 by the required width of the seepage passage 36.

Although O-ring seals 4 and 24 have been described, any suitable seal may be used. The slide 3 and 23 may be made of sealing material themselves, so that no separate seal is then required, the slide 3 and 23 forming a seal with the body 1 and 21 on engagement therewith.

What is claimed is:

1. A method of detecting milk clots in a milk flow line between a cow and a container including the steps of:
   placing in a vacuum milk flow line between a cow and the container a filter-detector casing having an inlet, an outlet, opposed transparent faces permitting visual inspection completely through the casing,
   and including in the casing a filter-detector element having a flow cross-sectional area substantially greater than the inlet cross-sectional area or the outlet cross-sectional area, said filter element having a perforated filter-detector area and a bypass opening,
   exerting a vacuum to draw milk from the cow through the milk flow line and through and filter-detector element such that at least some milk flows through the perforated filter-detector area and wherein air flows through the bypass to maintain vacuum in the milk flow line, the flow cross-sectional area of the bypass being large enough to maintain vacuum in the line even if the perforated area becomes completely clogged, and
   observing whether milk clots are contained in the milk by viewing the filter-detector area through said transparent faces to observe the presence or absence of milk clots on the filter-detector element.

2. A method of detecting milk clots in milk drawn from a plurality of cows being milked simultaneously and identifying any cow from which milk containing clots is being drawn, including for each cow all of the steps of claim 1, and in addition identifying the respective cow as one from which milk containing clots is being drawn or as one whose milk is free from milk clots, as the case may be.

3. A method as claimed in either claim 1 or 2, in which:
   the filter-detector casing has a slot, and
   the filter-detector element is mounted in a slide carrier removably fitting into said casing slot, and including a further step of washing out the flow line and filter-detector, after milking, with the filter-detector casing and filter-detector element in said position.

4. A method as claimed in either claim 1 or claim 2, including directing the milk into and through the casing through an inlet conduit which forms an acute angle relative to the plane of the perforated area, and an outlet conduit which extends at an acute angle on the opposite side of the perforated area and which is generally aligned with the inlet conduit, said observing step including observing a portion of the perforated area on the same side of the perforated area as the inlet conduit but spaced along that side of the perforated area away from the inlet conduit, such that the view through the transparent casing towards said portion is unobstructed by the inlet conduit.

5. In a system for milking a cow and including a milk flow line connectable at one end to a cow's udder and connectable at its other end to a vacuum source, the improvement comprising:

- a filter casing of unitary construction and having a fluid inlet connectable to the milk flow line in communication with the cow and a fluid outlet connectable to a vacuum source, said casing having opposed parallel transparent faces, the axes of the inlet and outlet being parallel to each other and extending parallel to the opposed faces,
- a filter element removably and reversibly insertable into an open slot in said casing and including sealing means for sealing said open slot when the filter element is positioned therein in either of said reversible positions,
- said filter element including a perforated filter area extending generally parallel to said opposed faces such that the said filter area is readily visible upon viewing through the opposed transparent faces,
- said filter element further comprising a unitary frame surrounding the edge of the perforated filter area to define therewith an inner area, and said unitary frame also includes an outer area which includes means for handling the filter element from outside of the casing,
- the sealing means defining a continuous line located in the vicinity of the open slot and generally parallelling the edge of the slot, so as to divide the filter into said inner portion on the side thereof within the casing, and said outer portion which is not exposed to the flow of liquid through the casing, and wherein the entire inner portions exposed to liquid flowing through the casing from the inlet to the outlet in either of the reversible positions of the filter within the casing, and the outer portion remains outside of the seal line in either of the reversible positions of the filter.

6. In a system for milking a cow and including a milk flow line connectable at one end to a cow's udder and connectable at its other end to a vacuum source, the improvement comprising:

- a filter-detector casing of unitary construction and having a fluid inlet connectable to the milk flow line in communication with the cow and a fluid outlet connectable to a vacuum source, said casing having opposed parallel transparent faces, the axes of the inlet and outlet being parallel to each other and extending parallel to the opposed faces,
- a filter-detector element removably and reversibly insertable into an open slot in said casing and including sealing means for sealing said open slot when the filter-detector element is positioned therein in either of said reversible positions,
- said filter-detector element including a perforated filter-detector area extending generally parallel to said opposed faces such that the said filter area is readily visible upon viewing through the opposed transparent faces,
- said filter-detector also including a bypass opening to assure the presence of a vacuum in the milk flow line,
- said filter-detector element further comprising a unitary frame surrounding the edge of the perforated filter area to define therewith an inner area, and said unitary frame also includes an outer area which includes means for handling the filter element from outside of the casing,
- the sealing means defining a continuous line located n the vicinity of the open slot and generally parallelling the edge of the slot, so as to divide the filter-detector into said inner portion on the side thereof within the casing, and said outer portion which is not exposed to the flow of liquid through the casing, and wherein the entire inner portion exposed to liquid flowing through the casing from the inlet to the outlet in either of the reversible positions of the filter-detector within the casing, and the outer portion remains outside of the seal line in either of the reversible positions of the filter-detector.

7. The invention of claim 5 or claim 6, said filter or filter-detector being dimensioned such that, when it is inserted into the open slot in the casing a seepage passage is formed between the filter or filter-detector and the casing interior for cleaning fluid to pass through.

8. The invention according to claim 6, wherein the flow area of the bypass is approximately equal to the flow area through the said fluid inlet.

9. The invention according to claim 6, wherein the bypass is defined by a wall raised above the level of the perforated area to thereby prevent sediment from washing from the perforated area into the bypass.

10. The invention of claim 5 or claim 6, wherein the fluid inlet and outlet are generally aligned with each other along a line which is at an acute angle relative to the perforated area, whereby a portion of the perforated area on the inlet side thereof is visible through the transparent face on that side, unobstructed by the inlet.

11. The invention of claim 10, wherein the inlet and the outlet have equal cross sections.

12. The invention of claim 5 or claim 6, wherein the sealing means comprises a ring seal arranged to seal with the whole of the slot face in one cross-sectional plane of the slot.

13. The invention according to claim 6, wherein the bypass is adjacent to the perforated area of the filter-detector element.

14. The invention according to claim 6, wherein the bypass opening is surrounded by the perforated area.

15. In a system for milking a cow and including a milk flow line connectable at one end to a cow's udder and connectable at its other end to a vacuum source, the improvement comprising:

- a filter casing having a fluid inlet connectable to the milk flow line in communication with the cow and a fluid outlet connectable to a vacuum source, said casing having opposed transparent faces,
- a filter element removably and reversibly insertable into an open slot in said casing and including sealing means for sealing said open slot when the filter element is positioned therein in either of said reversible positions,
- said filter element including a perforated filter area extending generally parallel to said opposed faces such that the said filter area is readily visible upon viewing through the opposed transparent faces, the sealing means defining a continuous line located in the vicinity of the open slot and generally parallelling the edge of the slot, so as to divide the filter into an inner portion which is not exposed to the flow of liquid through the casing, and wherein the entire inner portion is exposed to liquid flowing through the casing from the inlet to the outlet in either of the reversible positions of the filter within the casing, and the outer portion remains outside of the seal line in either of the reversible positions of the filter, and wherein said filter is dimensioned such that, when it is inserted into the open slot in the casing, a seepage passage is formed between the filter and the casing interior for cleaning fluid to pass through.

16. In a system for milking a cow and including a milk flow line connectable at one end to a cow's udder and connectable at its other end to a vacuum source, the improvement comprising:

a filter-detector casing having a fluid inlet connectable to the milk flow line in communication with the cow and a fluid outlet connectable to a vacuum source, said casing having opposed transparent faces, a filter-detector element removably and reversibly insertable into an open slot in said casing and including sealing means for sealing said open slot when the filter-detector element is positioned therein in either of said reversible positions, said filter-detector element including a perforated filter-detector area extending generally parallel to said opposed faces such that the said filter area is readily visible upon viewing through the opposed transparent faces, said filter-detector also including a bypass opening to assure the presence of a vacuum in the milk flow line, the sealing means defining a continuous line located in the vicinity of the open slot and generally parallelling the edge of the slot, so as to divide the filter-detector into an inner portion on the side thereof within the casing, and an outer portion which is not exposed to the flow of liquid through the casing, and wherein the entire inner portion is exposed to liquid flowing through the casing from the inlet to the outlet in either of the reversible positions of the filter-detector within the casing, and the outer portion remains outside of the seal line in either of the reversible positions of the filter-detector, and wherein said filter-detector is dimensioned such that, when it is inserted into the open slot in the casing, a seepage passage is formed between the filter and the casing interior for cleaning fluid to pass through.

17. In a system for milking a cow and including a milk flow line connectable at one end to a cow's udder and connectable at its other end to a vacuum source, the improvement comprising:

a filter-detector casing having a fluid inlet connectable to the milk flow line in communication with the cow and a fluid outlet connectable to a vacuum source, said casing having opposed transparent faces, a filter-detector element removably and reversibly insertable into an open slot in said casing and including sealing means for sealing said open slot when the filter-detector element is positioned therein in either of said reversible positions, said filter-detector element including a perforated filter-detector area extending generally parallel to said opposed faces such that the said filter area is readily visible upon viewing through the opposed transparent faces, said filter-detector also including a bypass opening to assure the presence of a vacuum in the milk flow line, and wherein the flow area of the bypass is approximately equal to the flow area through the said fluid inlet, the sealing means defining a continuous line located in the vicinity of the open slot and generally parallelling the edge of the slot, so as to divide the filter-detector into an inner portion on the side thereof within the casing, and an outer portion which is not exposed to the flow of liquid through the casing, and wherein the entire inner portions exposed to liquid flowing through the casing from the inlet to the outlet in either of the reversible positions of the filter-detector within the casing, and the outer portion remains outside of the seal line in either of the reversible positions of the filter-detector.

18. In a system for milking a cow and including a milk flow line connectable at one end to a cow's udder and connectable at its other end to a vacuum source, the improvement comprising:

a filter-detector casing having a fluid inlet connectable to the milk flow line in communication with the cow and a fluid outlet connectable to a vacuum source, said casing having opposed transparent faces, a filter-detector element removably and reversibly insertable into an open slot in said casing and including sealing mean for sealing said open slot when the filter-detector element is positioned therein in either of said reversible positions, said filter-detector element including a perforated filter-detector area extending generally parallel to said opposed faces such that the said filter area is readily visible upon viewing through the opposed transparent faces, said filter-detector also including a bypass opening to assure the presence of a vacuum in the milk flow line, the bypass being defined by a wall raised above the level of the perforated area to thereby prevent sediment from washing from the perforated area into the bypass, the sealing means defining a continuous line located in the vicinity of the open slot and generally parallelling the edge of the slot, so as to divide the filter-detector into an inner portion on the side thereof within the casing, and an outer portion which is not exposed to the flow of liquid through the casing, and wherein the entire inner portion is exposed to liquid flowing through the casing from the inlet to the outlet in either of the reversible positions of the filter-detector within the casing, and the outer portion remains outside of the seal line in either of the reversible positions of the filter-detector.

* * * * *